(12) United States Patent
Gavrilovic et al.

(10) Patent No.: US 10,855,539 B2
(45) Date of Patent: *Dec. 1, 2020

(54) CONFIGURATION OF FORWARDING RULES USING THE ADDRESS RESOLUTION PROTOCOL

(71) Applicant: Telefonaktiebolaget LM Ericsson (publ), Stockholm (SE)

(72) Inventors: Sasa Gavrilovic, Zagreb (HR); Ivica Matausic, Samobor (HR)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/423,510

(22) Filed: May 28, 2019

(65) Prior Publication Data

US 2019/0280930 A1 Sep. 12, 2019

Related U.S. Application Data

(63) Continuation of application No. 14/908,920, filed as application No. PCT/EP2013/066312 on Aug. 2, 2013, now Pat. No. 10,355,932.

(51) Int. Cl.
*G06F 15/177* (2006.01)
*H04L 12/24* (2006.01)
(Continued)

(52) U.S. Cl.
CPC ...... *H04L 41/0886* (2013.01); *H04L 41/0806* (2013.01); *H04L 45/74* (2013.01);
(Continued)

(58) Field of Classification Search
USPC .......... 709/222, 201, 202, 245, 230
See application file for complete search history.

(56) References Cited

U.S. PATENT DOCUMENTS 7,535,902 B2 5/2009 Yamazaki et al.
2006/0062190 A1 3/2006 Suga
(Continued)

FOREIGN PATENT DOCUMENTS

WO WO 2009/108593 A1 9/2009

OTHER PUBLICATIONS

Indian Examination Report for Indian Application No. 11668/DELNP/2015 dated Nov. 15, 2019, 7 Pages.
(Continued)

*Primary Examiner* — Lan Dai T Truong
(74) *Attorney, Agent, or Firm* — Sage Patent Group

(57) ABSTRACT

A method, by a host providing an application, configures forwarding rules in a traffic distributor using an address resolution protocol. The host receives IP data packets distributed by the traffic distributor to different hosts located in a first network based on a predefined forwarding criterion contained in the forwarding rules. The host applies the application to the IP data packets. The host determines whether a predefined operating status of the host is met. If met, a message is generated using the address resolution protocol. The message contains information for which at least one characteristic of the predefined forwarding criterion the IP data packets should be forwarded to the host, and a configuring indicator by which the traffic distributor is initiated to generate the forwarding rule for the host taking into account the at least one characteristic contained in the message. The generated message is transmitted to the traffic distributor.

19 Claims, 11 Drawing Sheets

(51) Int. Cl.
   *H04L 29/12*  (2006.01)
   *H04L 29/06*  (2006.01)
   *H04L 12/741* (2013.01)

(52) U.S. Cl.
   CPC .......... *H04L 45/745* (2013.01); *H04L 61/103* (2013.01); *H04L 69/16* (2013.01); *H04L 41/0213* (2013.01)

(56) References Cited

U.S. PATENT DOCUMENTS

| | | |
|---|---|---|
| 2008/0084866 A1 | 4/2008 | Johnson et al. |
| 2010/0138550 A1 | 6/2010 | Lee et al. |
| 2013/0148543 A1 | 6/2013 | Koponen et al. |

OTHER PUBLICATIONS

International Search Report and Written Opinion of the International Searching Authority, Application No. PCT/EP2013/066312, dated Apr. 10, 2014.

"The Linux Virtual Server Project—Linux Server Cluster for Load Balancing", downloaded Jan. 27, 2016 from http://www.linuxvirtualserver.org/index.html, 2 pp.

Arkko et al., IANA Allocation Guidelines for the Address Resolution Protocol (ARP), Network Working Group, Request for Comments: 5494, Category: Standards Track, Apr. 2009, 7 pp.

Case et al., A Simple Network Management Protocol (SNMP), Network Working Group, Request for Comments: 1157, May 1990, 36 pp.

Enns et al., "Network Configuration Protocol (NETCONF)", Internet Engineering Task Force (IETF), Request for Comments: 6241, Category: Standards Track, Jun. 2011, 113 pp.

IANA, "Address Resolution Protocol (ARP) Parameters", downloaded Jan. 27, 2016 from http://www.iana.org/assignments/arp-parameters/arp-parameters.xml, 4 pp.

IANA, "Protocol Numbers", downloaded Jan. 27, 2016 from https://www.iana.org/assignments/protocol-numbers/protocol-numbers/xml, 9 pp.

Plummer, "An Ethernet Address Resolution Protocol—or—Converting Network Protocol Addresses to 48.bit Ethernet Address for Transmission on Ethernet Hardware", Network Working Group, Request for Comments: 826, Nov. 1982, 10 pp.

| Condition | Next-hop |
|---|---|
| Destination IP address + Destination port range (port_low, port_high) + Transport protocol | Next-hop IP adress or Next-hop MAC address |

FIG. 2

| Condition | Next-hop |
|---|---|
| Source IP address + Source port range (port_low, port_high) + Transport protocol | Next-hop IP adress or Next-hop MAC address |

FIG. 3

| bit offset | Internet Protocol (IPv4) over Ethernet ARP packet | |
|---|---|---|
| | 0-7 | 8-15 |
| 0 | Hardware type (HTYPE) | |
| 16 | Protocol type (PTYPE) | |
| 32 | Hardware address lenght (HLEN) | Protocol address lenght (PLEN) |
| 48 | Operation (OPER) | |
| 64 | Sender hardware address (SHA)(first 16 bits) | |
| 80 | (next 16 bits) | |
| 96 | (last 16 bits) | |
| 112 | Sender protocol address (SPA)(first 16 bits) | |
| 128 | (last 16 bits) | |
| 144 | Target hardware address (THA)(first 16 bits) | |
| 160 | (next 16 bits) | |
| 176 | (last 16 bits) | |
| 192 | Target protocol address (TPA)(first 16 bits) | |
| 208 | (last16 bits) | |

| Parameter | Value |
|---|---|
| SHA | MAC address of the server interface on which the resolved IP address is configured |
| SPA | Real IP address of the server interface on which the resolved IP address is configured. It may or may not be equal to the shared IP address. |
| THA | MAC address of the router interface on broadcast MAC address. |
| TPA | IP address of the router interface or SPA. |
| RTD | Routing Data (10 octets) Extension to standard ARP packet structure. This parameter contains the routing information: First 8 bits – Type of forwarding (0: forward by destination address, 1: forward by source address, >1: unassigned) Next 8 bits – Protocol (e.g.UDP, TCP, SCTP) Next 16 bits – IP address (higher 16 bits) Next 16 bits – IP address (lower 16 bits) Next 16 bits – Port (high) – highest port in the range Next 16 bits – Port (low) – lowest port in the range |

FIG. 4

CONFIGURATION OF FORWARDING RULES USING THE ADDRESS RESOLUTION PROTOCOL

CROSS REFERENCE TO RELATED APPLICATION

This application is a continuation of U.S. patent application Ser. No. 14/908,920, filed Jan. 29, 2016, which is a 35 U.S.C. § 371 national stage application of PCT International Application No. PCT/EP2013/066312, filed on Aug. 2, 2013, the disclosure and content of which is incorporated by reference herein in its entirety. The above-referenced PCT International Application was published in the English language as International Publication No. WO 2015/014414 A1 on Feb. 5, 2015.

TECHNICAL FIELD

The present invention relates to a method, by a host providing an application, to configure forwarding rules in a traffic distributor and to the host. The invention furthermore relates to a method, by a traffic distributor, to generate forwarding rules used by the traffic distributor to distribute IP data packets to a plurality of hosts and to the corresponding traffic distributor.

BACKGROUND

A virtual IP address (VIP) is an IP address assigned to multiple applications residing on a single server or single application residing on multiple servers rather than being assigned to a specific single server. Incoming IP data packets are sent to the VIP address and the data packets are routed to the actual network interfaces. In a system using this shared virtual IP address space, it is usually required to have a router or traffic distributor that distributes traffic across the different servers in the cluster using the same VIP. In FIG. 1 such a system is shown. A host 10 located in an external IP network 15 routes incoming IP data packets to a traffic distributor 20. The external IP network may contain a number of external routers or several subnets. The traffic distributor 20 then distributes the incoming IP data packet to the different hosts 21 to 23. There might be an arbitrary number of hosts as indicated by H21 to H2n. As can be seen from FIG. 1, all of the hosts have the same VIP. One possibility for distributing the IP packets between the hosts or servers is by configuring different port ranges on the shared VIP. As each host 21 to 23 has assigned a different port range, incoming data packets are distributed based on the protocol and port within an IP datagram. The traffic distribution is done in the router or traffic distributor. The router contains forwarding rules, e.g. policy based forwarding (PBF) rules, which are used to distribute the data packets to the different hosts. The forwarding rules may be configured through configuration commands. However, such a configuration implies additional expense for developing and configuring an operation and management (O & M) layer for the router which distributes the traffic. Furthermore, a dependency exists between the operation and management layers in the server cluster and in the router/traffic distributor. By way of example, when VIPs are configured in the server cluster, the different hosts, the forwarding rules or PBF rules should be configured in the router distributing the traffic.

The concept of a virtual server for load-sharing in a server cluster is well-known. However, there is no mechanism for automatic configuration of the forwarding rules in the traffic distributor.

An Address Resolution Protocol (ARP) as, for example, defined in IETF RFC 826 is widely used for resolving the network layer (IP) address into the link layer (MAC) address in IP networks. ARP uses operation code parameters to indicate the ARP message type and is specified by the IANA organization. Numbers 26 to 56.534 are unassigned and can be used for new operations.

Policy-based forwarding (PBF) or policy-based routing (PBR) is a technique used to make routing decisions based on policies set by a network administrator. One possibility for forwarding or routing is a port range number. By way of example, in a virtual server load-sharing is often implemented by assigning a different port range to each real server in the cluster. In addition to the port range, other criteria may be used by a traffic distributor to distribute IP data packets to different hosts. Currently, the rules used by a traffic distributor to distribute IP data packets are manually configured by a network operator. This existing solution based on manual configuration of traffic distributor is prone to human errors. Furthermore, the problem exists with the synchronized adding or removal of a server in a server cluster. It is hard to avoid traffic loss when the forwarding rules are reconfigured manually.

In case of a centralized operation of a management system for a server cluster and a traffic distributor, there exists a possibility to add a network configuration layer, e.g. based on SNMP (Simple Network Management Protocol, see IETF RFC 1157) or a network configuration protocol between the real servers and the traffic distributor in order to configure the forwarding rules. However, such a solution implies implementing a new protocol layer in both the real servers and the traffic distributor. This, however, would mean that additional and expensive software is needed for implementation.

SUMMARY

Accordingly, a need exists to obviate at least some of the above mentioned problems and to facilitate the configuration of forwarding rules in a traffic distributor.

This need is met by the features of the independent claims. Further embodiments are described in the dependent claims.

According to a first aspect of the invention a method is provided by a host providing an application to configure forwarding rules in a traffic distributor using an address resolution protocol, wherein the host receives IP data packets distributed by the traffic distributor to a plurality of different hosts located in a first network based on a predefined forwarding criterion contained in the forwarding rules. The host applies the application to the received data packets. According to one step of the method it is determined by the host whether a predefined operating status of the host is met. If the predefined operating status is met, a message is generated using the address resolution protocol. This message contains information for which at least one characteristic of the predefined forwarding criterion the IP data packets should be forwarded to the host. The message furthermore contains a configuring indicator by which the traffic distributor is initiated to generate the forwarding rule for the host taking into account the at least one characteristic contained in a message. Furthermore, the generated message of the address resolution protocol is transmitted to the traffic distributor.

The traffic distributor can then, based on the configuring indicator in the received message, generate the forwarding rule for the host from which the ARP message is received. This provides an automatic configuration of forwarding rules in the traffic distributor. The mechanism uses the existing address resolution protocol to configure the forwarding rules in the traffic distributor. The use of the address resolution protocol has the advantage that it is already used in most IP networks for resolving IP to MAC addresses.

One possible forwarding criterion can be a range of port numbers. In this embodiment the message is generated containing, as the at least one characteristic, a range of port numbers of the host, at which the host is configured to receive IP data packets from the traffic distributor. The traffic distributor can then generate or amend an existing forwarding rule for the host by indicating that this host is ready to accept IP data packets for a certain number of ports. However, it should be understood that the invention is not restricted to a traffic distribution based on port ranges. The distribution based on port ranges is one way of sharing a virtual IP address. Another forwarding criterion could be a current CPU load of each of the hosts. Furthermore, any other criterion the traffic distributor can access in an IP data packet might be used, e.g. a source IP address and a port, a target IP address and a port, the transport protocol used (e.g. UDP (User Datagram Protocol)), TCP (Transmission Control Protocol), SCTP (Stream Control Transmission Protocol). Another possible forwarding criterion could be protocol elements of an upper layer, e.g. a tunnelling and point identity in a GTP protocol (GPRS Tunnelling Protocol).

When the host identifies a predefined operating status, the message is generated using the ARP. One possibility of the predefined operating status is whether a request message of the address resolution protocol is received so that the generated message is transmitted to the traffic distributor as a response message to the received request message. When the request message is received, it may be checked whether the request message contains the information that, for a virtual IP address in the received request message, IP data packets are distributed by the distributor based on port ranges.

Another operating status which may trigger the generation of the message and the transmission of the generated message to the traffic distributor may be the fact that the predefined operating status is a pre-configured operating status of the host. If this pre-configured operating status, e.g. configured by an operator at the host, is detected, the generated message is transmitted as a broadcast message to all nodes of the first network.

The invention furthermore relates to the host providing the application and configured to configure the forwarding rules in the traffic distributor using the address resolution protocol. The host contains an input/output unit configured to receive IP data packets distributed by the traffic distributor to a plurality of different hosts located in the first network based on the predefined forwarding criterion contained in the forwarding rules. The host furthermore contains the application to be applied to receive the IP data packets. The host furthermore comprises a processing unit configured to determine whether a predefined operating status of the host is met and an interface configured to transmit a message of the address resolution protocol to the traffic distributor. A message generating unit is provided configured to generate messages according to the address resolution protocol. If the processing unit determines that the predefined operating status is met, the message generating unit generates a message using the address resolution protocol containing information for which at least one characteristic of the predefined forwarding criterion the IP data packets should be forwarded to the host. The message furthermore contains the configuring indicator by which the traffic distributor is initiated to generate the forwarding rule for the host taking into account the at least one characteristic contained in the message. The interface of the host is then configured to transmit the generated message to the traffic distributor.

The invention furthermore relates to a method, by a traffic distributor, to generate forwarding rules which are used by the traffic distributor to distribute IP data packets to a plurality of different hosts based on a predefined forwarding criterion contained in the forwarding rules, the different hosts being located in the first network. According to one step of the method, a message is received generated with the address resolution protocol from one of the plurality of hosts, the message containing information for which at least one characteristic of the predefined forwarding criterion the IP data packets should be forwarded to the host from which the message is received. The message furthermore contains a configuring indicator by which the traffic distributor is initiated to generate a forwarding rule for the host from which the message is received taking into account the at least one characteristic contained in the message. The forwarding rule is then generated for the host from which the message is received based on the configuring indicator contained in the received message and the generated forwarding rule contains the at least one characteristic contained in the message. Furthermore, IP data packets are distributed to the plurality of hosts and the IP data packets are distributed to the host from which the message is received based on the generated forwarding rule.

The message may be received as a reply message to a request message which was sent by the traffic distributor to the first network using the address resolution protocol. Furthermore, it is possible that reply messages are received from the hosts of the first network, and for each received reply message the forwarding rule for the host from which the reply message is received is generated using the at least one characteristic contained in the corresponding received message. Furthermore, it may be possible that the received reply message received from one of the hosts contains a virtual IP address of said one host, at least one port number at which said one host is configured to receive IP data packets and a physical address of said one host the traffic distributor uses to forward IP data packets to said one host. The generated forwarding rules generated by the traffic distributor can be stored in the traffic distributor, e.g. in forwarding tables.

In another embodiment the received message is a broadcast message broadcast from one of the hosts contained in the first network and the traffic distributor generates the forwarding rule for the host from which the broadcast message is received based on the at least one characteristic contained in the received broadcast message.

The invention furthermore relates to the corresponding traffic distributor configured to generate the forwarding rules as mentioned above. The traffic distributor contains an interface configured to receive the message generated with the address resolution protocol, a processing unit configured to generate the forwarding rules for the IP data packets as discussed above and a distribution unit configured to distribute the IP data packets to the plurality of hosts based on the generated forwarding rule.

The features mentioned above and discussed in more detail further below may be used in the described context. However, each of the features may also be used alone or in combination with any of the other features described above or described in further detail below.

BRIEF DESCRIPTION OF THE DRAWINGS

The invention will be described in further detail with reference to the accompanying drawings.

FIG. 2 is schematic view of a forwarding rule based on destination IP address and port range, FIG. 3 is a schematic view of a forwarding rule based on source IP address and port range, FIG. 4 shows two tables with a packet structure of an ARP packet used to generate forwarding rules.

DETAILED DESCRIPTION

Figure 1:
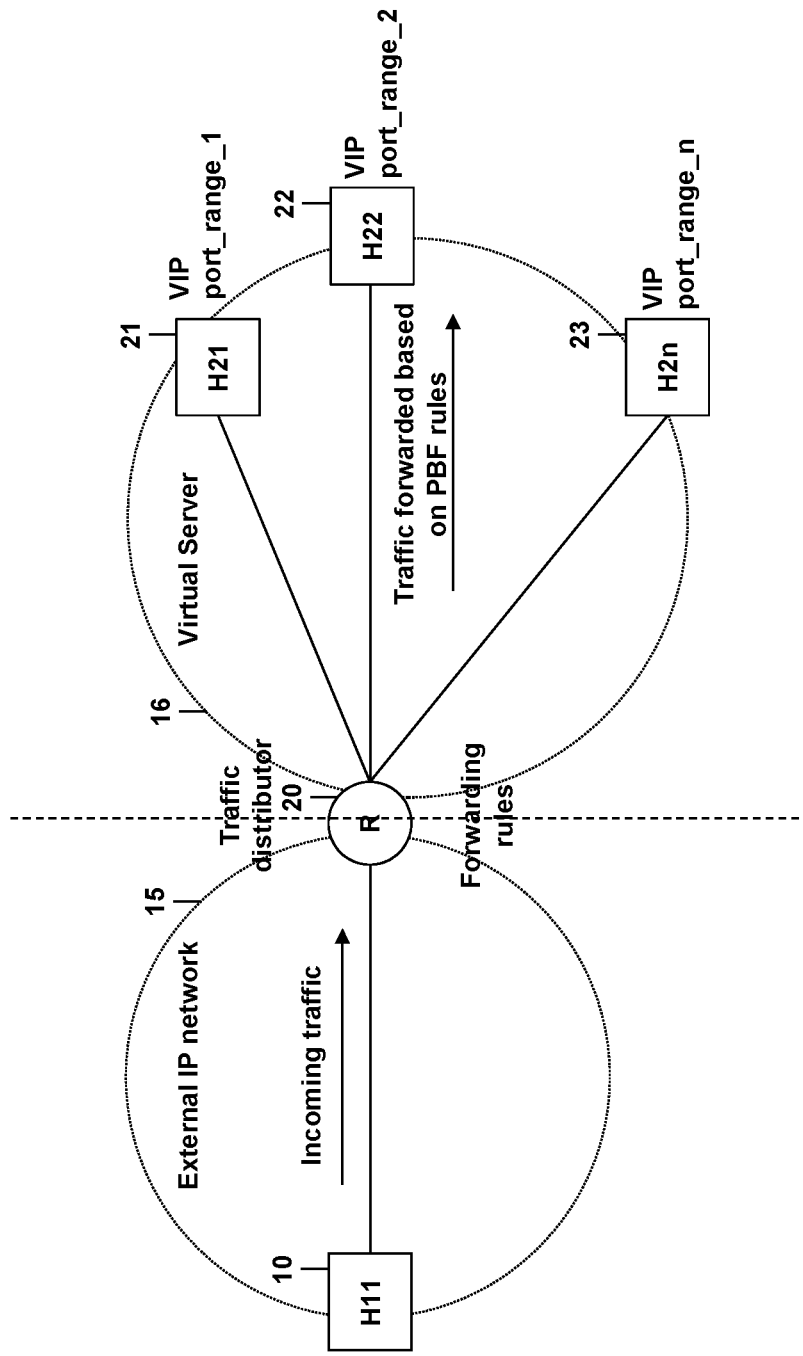
FIG. 1 is a schematic view of a situation in which a traffic distributor distributes IP data packets to different hosts.

In the present invention forwarding rules for a traffic distributor are configured using the Address Resolution Protocol (ARP). The ARP message is sent by a host to which the traffic distributor distributes traffic.

In the following this message is also named route_reply message hereinafter and it is similar in function to a normal ARP reply message, i.e. it also resolves an IP address to a MAC address. However, this route_reply message includes additional routing data that is used for configuring the forwarding rules.

A predefined forwarding criterion is present in the message generated by the host, the traffic distributor using this criterion to distribute the traffic. One possible forwarding criterion is the destination IP address and/or port number to which the IP data packets are to be transmitted. In more general words, the predefined forwarding criterion is at least one of a destination IP address and port number to which the IP data packets are to be transmitted. The generated message contains at least one of the destination IP address and port number and initiates the generation of the forwarding rule in the traffic distributor that IP data packets with said at least one of destination IP address and port number are forwarded to the host from which the generated message is received. In FIG. 2 a table is shown in which, in dependence on the destination IP address and destination port range, the next-hop IP address or MAC address is identified. The criterion shown on the left side of the table (condition) may be contained in the received reply message and the traffic distributor may have generated a forwarding rule as shown in FIG. 2. The traffic distributor will then forward all IP data packets with a configured destination IP address, port and protocol to a given next-hop address. In connection with FIG. 3 the predefined criterion is a source IP address and port number from which the IP data packets are received. The message generated by the host then contains at least one of the source IP address and port number and the generated message, when received by the traffic distributor, initiates the generation of a forwarding rule in the traffic distributor that IP data packets with said at least one of the source IP address and port number are forwarded to the host from which the generated message is received.

The forwarding rules used by the traffic distributor may have a format as shown in the tables of FIGS. 2 and 3. Instead of using the source or destination IP address as a forwarding criterion, other criteria such as drop policies, forwarding based on other protocol elements etc. might be used. The use of the address resolution protocol has the advantage that packet forwarding is done on the IP layer itself, thus there is no need to pass the forwarding information through upper layers in order to configure the forwarding rules. Furthermore, a complicated manual configuration is avoided as well as implementing a network configuration layer. When the traffic distributor or router receives this message, it will configure the required forwarding rules based on the received parameters. Once a forwarding rule is configured, all traffic matching the forwarding rule will be passed on to the configured next-hop address.

In FIG. 4 the packet structure of an ARP message is shown. The left table shows the standard ARP packet structure. In the right table of FIG. 4 the parameters are indicated which might be used to add the new functionality of the configuration of the forwarding rules. It should be understood that the format and the names shown in FIG. 4 represent only one possible implementation of the invention. In the example shown in the right table of FIG. 4 the forwarding based on destination address or source address is indicated. The type of forwarding information in the routing data (RTD) indicates to what type of forwarding the rest of the data refers to. By way of example, if the value 0 is used, the traffic distributor is informed that forwarding based on a destination port and IP address is used, whereas when the value 1 is used, the traffic distributor should use forwarding based on source port and IP address. The message furthermore contains a configuring indicator by which the involved entities know that this message is additionally used to configure forwarding rules. This configuring indicator, which may be implemented as an operation code from a list of ARP operation codes, may be the code 26 which is the first code not yet assigned. Any host receiving this type of ARP operation will be able to recognize the new ARP type by this protocol parameter.

As indicated in FIG. 4, the routing data may contain protocol information. It is the protocol used in the payload of the IP datagram, according IANA assigned internet protocol numbers. By way of example, if the protocol=# FF then the port range is applicable for any protocol received in the IP datagram.

The IP address can be either the source or destination address in the IP packet to be forwarded. In a virtual server with forwarding based on port distribution that is the virtual IP address.

A further piece of information indicates the highest port in the port range and the lowest port in the port range. If the highest port corresponds to the lowest port, then forwarding is applicable for a single port and IP address combination only. If the highest port number is smaller than the lowest port number, then the ARP message is considered invalid and may be discarded. If the high port number is 65.535 and the low port number is 0, then the whole port range is used meaning that the port itself is not checked.

Figure 5:
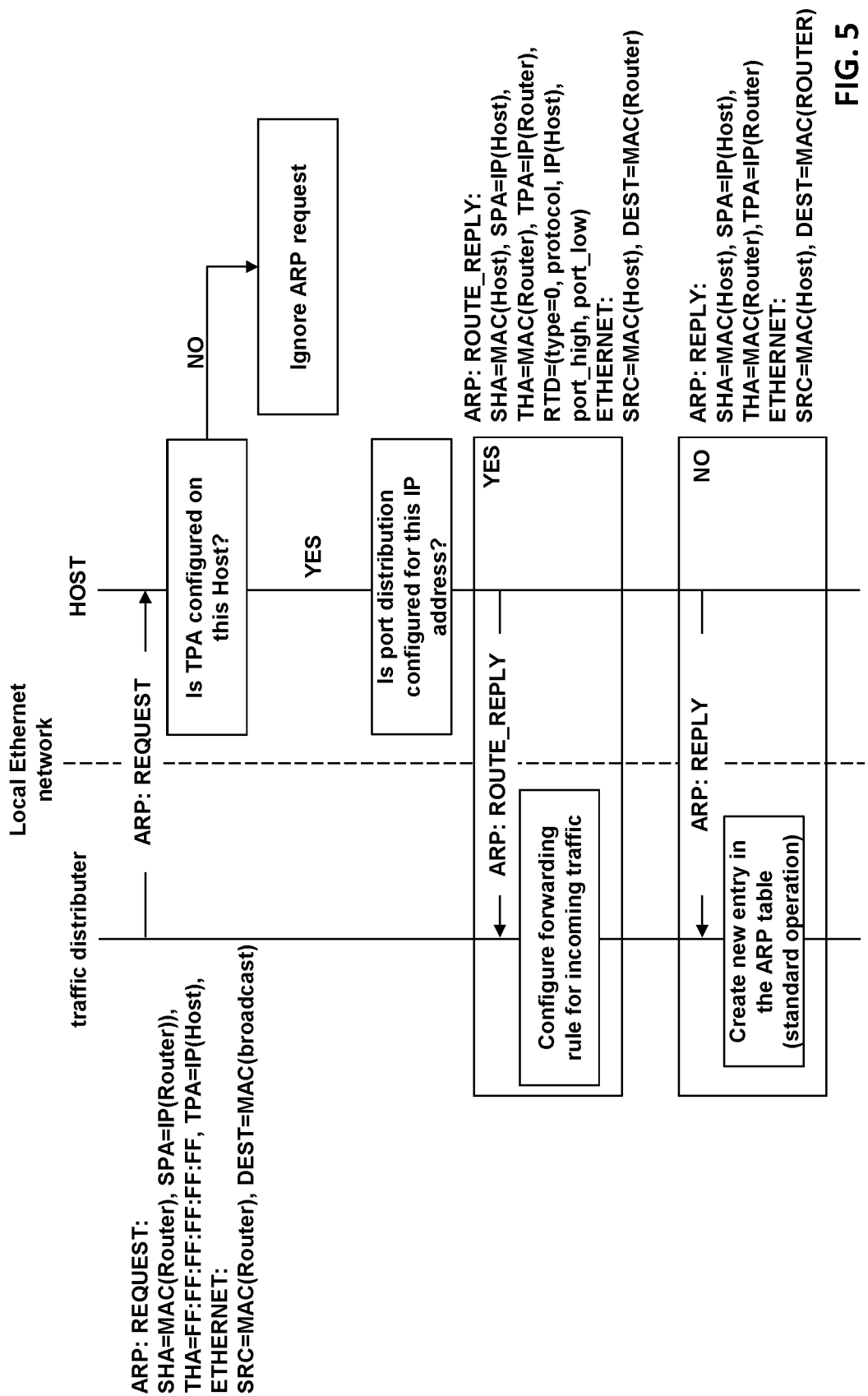
FIG. 5 shows a signalling diagram when the ARP message generating a forwarding rule is sent as a reply message to a request from the traffic distributor.

As will be described in connection with FIGS. 5 and 6, the generated ARP message, the route_reply message may be used in two different ways: First of all, it may be used as a response to a standard ARP request. Secondly, it may be used as a broadcast announcement. The first alternative is discussed in connection with FIG. 5. The traffic distributor may send an ARP request in which the IP address of the router interface TPA includes the shared IP address. If this message is received by the host, the latter will check whether the received IP address is configured and whether port distribution is configured for this IP address. If the IP address is not configured, the ARP request is ignored as it is known from standard ARP handling. If the IP address is configured and the port distribution is not configured for this IP address, the receiving host may reply with a normal ARP reply including its own MAC address. If the IP address is configured and port distribution is configured for this IP address, the receiving host shall respond with the newly generated message, here an ARP route_reply message may be sent directly to the traffic distributor's MAC address, i.e. the SHA from the ARP request. This is to avoid broadcasting the route_reply towards the host that did not request it.

In more general words, the generated response message is transmitted to a physical address of the traffic distributor, which is identified in the received request message.

Figure 6:
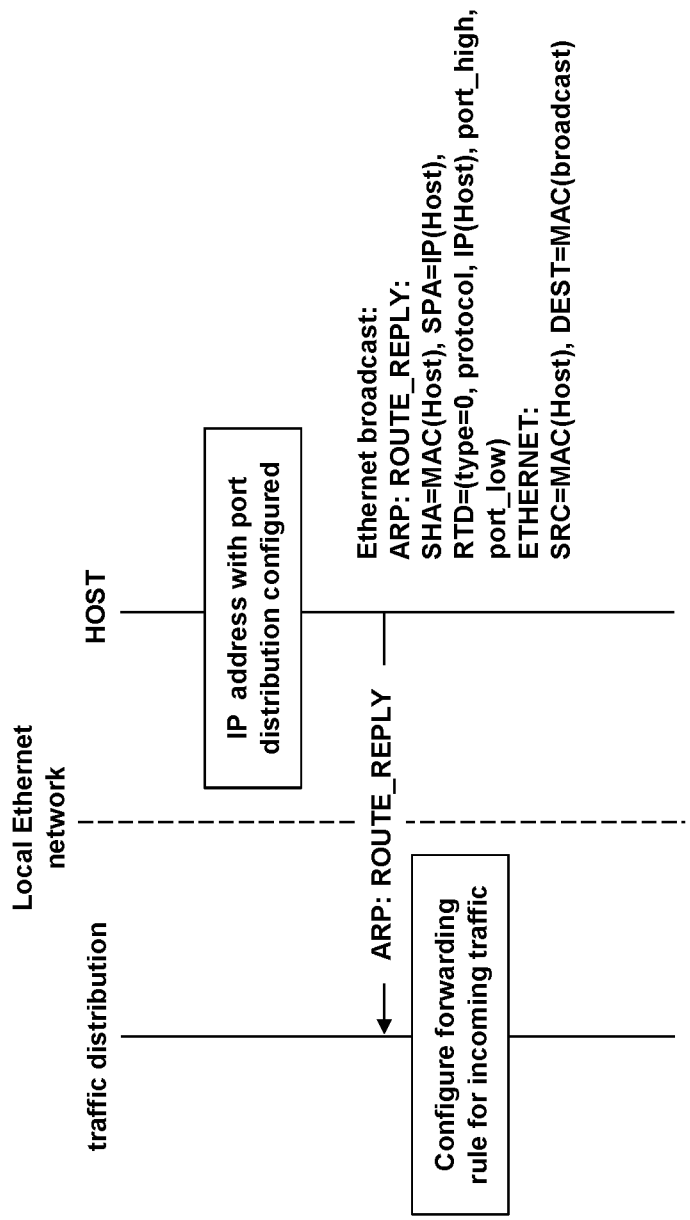
FIG. 6 shows a signalling diagram where the ARP message generating a forwarding rule is sent as a broadcast message.

In the embodiment of FIG. 6 the newly generated message may be sent as a broadcast announcement. This message is sent on the network in which the host is located. This embodiment may be useful for pre-configuring the required forwarding rules before the actual traffic is started. The support for this message, the route_reply message of FIG. 6, is configured on each host with a system parameter. When a shared IP address is configured on the host, it will send a route_reply message with the configuration shown in FIG. 6. In the broadcast message, the ARP packet is destined towards the Ethernet broadcast address (FF:FF:FF:FF:FF:FF). In this way the route_reply message is broadcast to all hosts of the network, e.g. first network, in which the host is located. The traffic distributor receives the broadcast ARP route_reply message and configures the forwarding rule. Other hosts on the same network just drop the packet. Generally speaking, in this embodiment the host determines the predefined operating status as a pre-configured operating status and in this pre-configured operating status the generated message is transmitted as a broadcast message to all nodes of the network in which the host is located. By way of example, the pre-configured operating status may be detected when the host detects that it is working with a shared virtual IP address wherein other hosts in the network in which the host is located have the same virtual IP address and a traffic distributor distributes the IP data packets between this host and the other hosts for the application to be applied.

Figure 7:
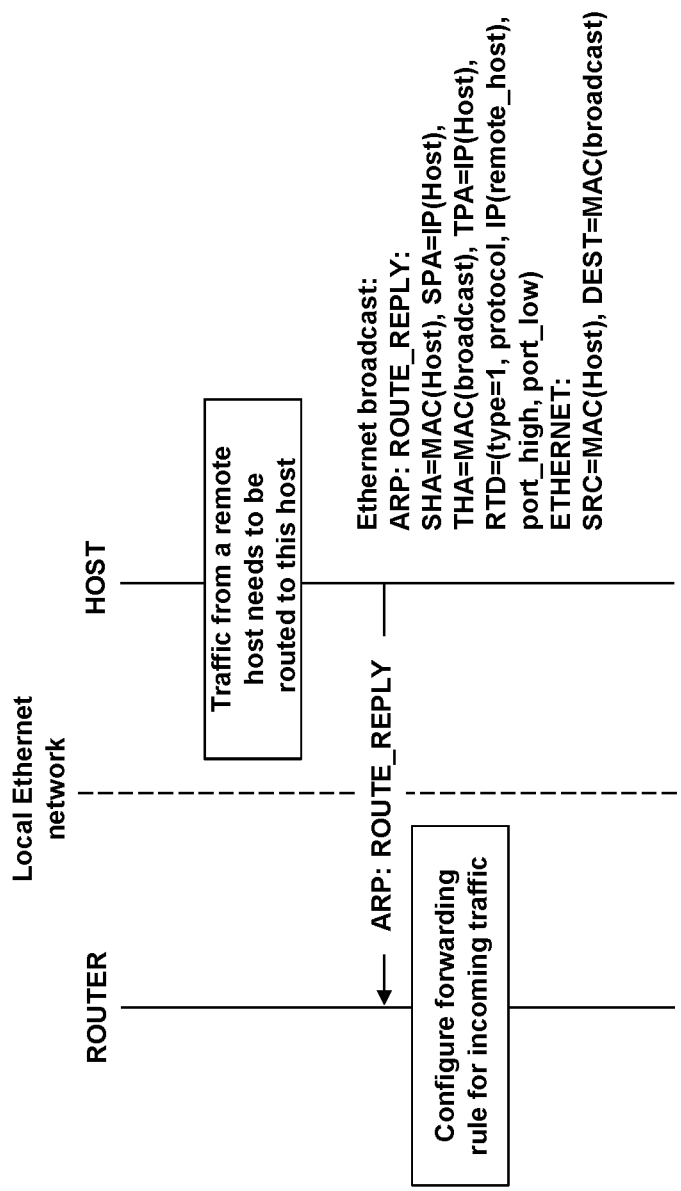
FIG. 7 shows a signalling diagram where forwarding rules are configured based on source IP address and port.

In connection with FIG. 7 an embodiment is shown where the newly generated route_reply message is used for a forwarding based on a source IP address or port. The route_reply message may also be used for configuring traffic distribution based on source IP address port and protocol. Forwarding rules for incoming traffic are configured using the broadcast route reply. In this embodiment the host can determine that traffic from a certain host should be forwarded to this host.

Figure 8:
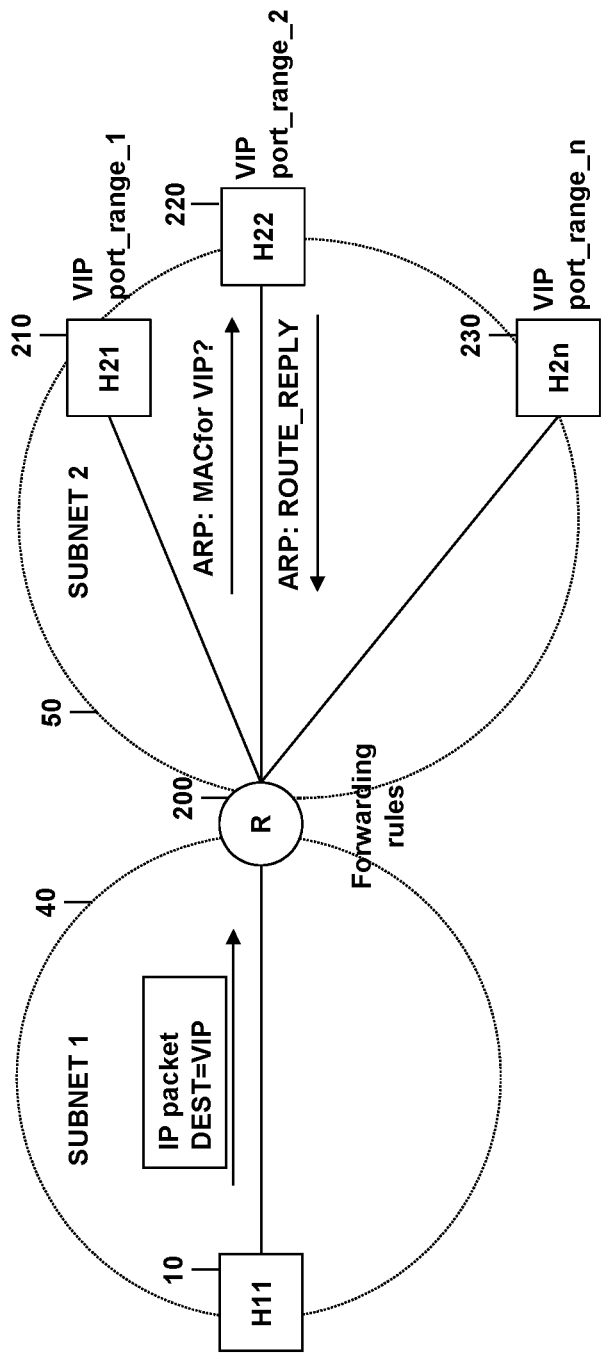
FIG. 8 shows a schematic view of a situation of distributing IP data packets when the sending and receiving hosts are located in different subnets.
Figure 9:
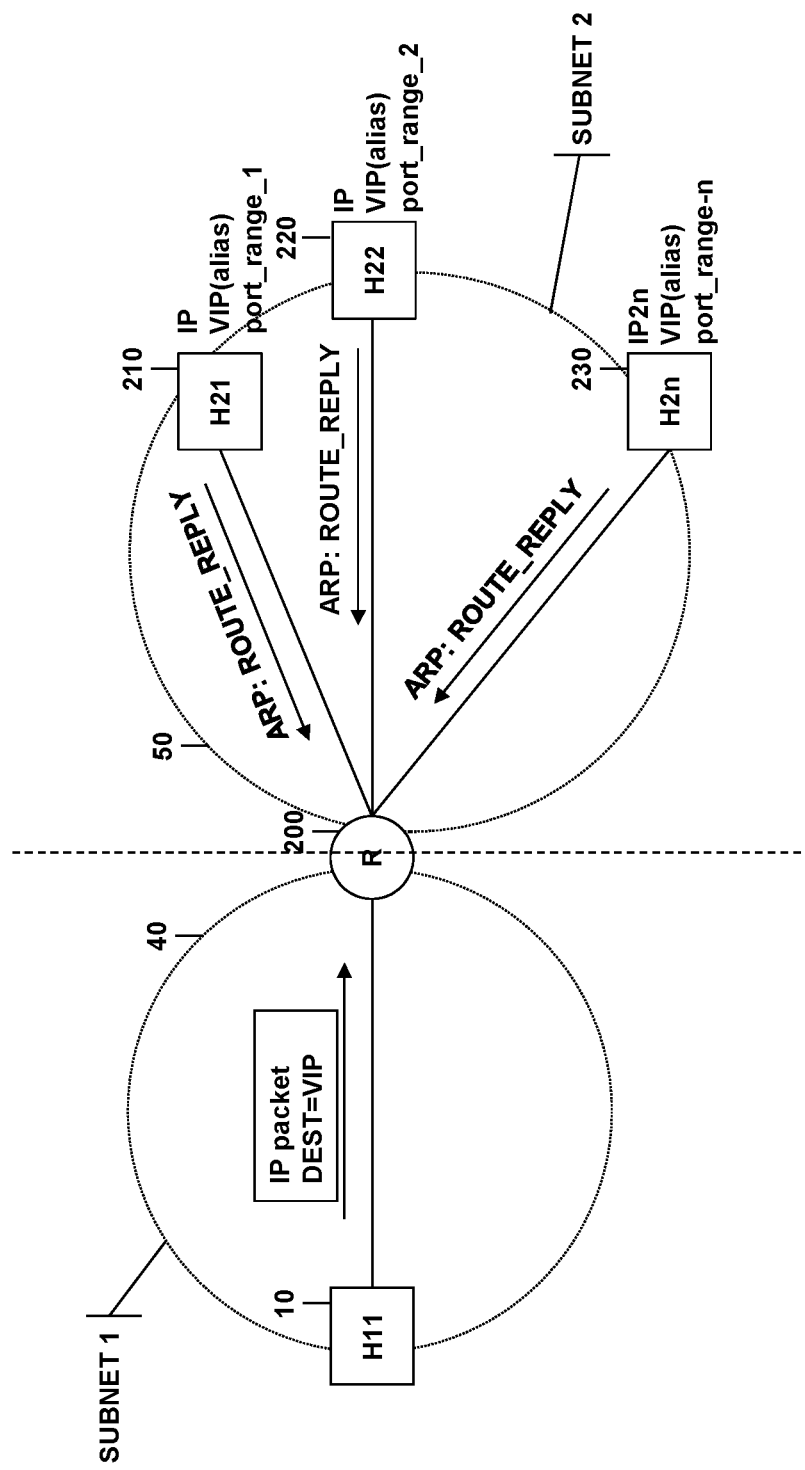
FIG. 9 shows a situation of distributing data packets when the sending and receiving hosts are located in the same subnet.

In connection with FIGS. 8 and 9 different traffic situations are discussed. One traffic situation as shown in FIG. 8 is a situation when the receiving virtual IP address resides on a different subnet than the host sending the packet. As shown in FIG. 8, a host 10 sends a packet with the destination IP address VIP towards the next-hop router or traffic distributor 200. The router 200 looks up the MAC address of the VIP in the ARP table. If the MAC cannot be resolved, the traffic distributor 200 drops the packet and tries resolving the MAC for the VIP. Traffic distributor 200 sends an ARP request to the subnet in which the VIP resides. Each host in the subnet responds with a route reply with the VIP, port range and the next-hop MAC address. The traffic distributor 200 configures the forwarding rules and is prepared to handle incoming traffic having a destination address of VIP. This embodiment shows that a virtual IP address is shared in the network without a common operation management system for the router or traffic distributor 200 and the server cluster. The only requirement is that the route_reply message is supported in the traffic distributor 200 and the different hosts 210-230. In the embodiment shown in FIG. 8 the host sending the packet is located in a first network 40, whereas the receiving host is located in the other network 50, also named first network in the present invention.

In the embodiment shown in FIG. 8 the router 200 can be either configured such that the router transmits a request and the hosts respond with the route_reply message. Furthermore, the system may also be configured in such a way that the different hosts each send a broadcast route_reply message. Both embodiments are possible when the host has the same virtual IP address as the other hosts to which the IP data packets are distributed.

Thus, in this embodiment the different hosts may have a pre-configured operating status and, based on this pre-configured operating status, the hosts may generate the route_reply message as a broadcast message sent to all nodes of the first network, the network 50.

Furthermore, in more general terms, the pre-configured operating status may apply when the host detects that it is working with a shared virtual IP address, wherein other hosts in the first network have the same virtual IP address, the traffic distributor distributing the IP data packets between the host and the other hosts for the application to be applied. An example for an application is a multimedia application processing streaming media over RTP/UDP (Real-time Transport Protocol/User Datagram Protocol). Each media stream is distributed to the servers sharing a virtual IP address, by using the stream's destination IP address and port number. In the embodiment of FIG. 8 the virtual IP address is defined on each host 210-230 as the hosts' real IP address.

In the embodiment disclosed in connection with FIG. 9 the virtual IP address to which the packets are sent does not belong to the first network in which the hosts are located. As can be deduced from FIG. 9, each of the different hosts 210-230 has a different IP address. In the embodiment of FIG. 9 the host 10 sending the packet resides on the same network as the receiving VIP. The subnet 2 (network 50) is hidden from the outside network. The traffic distributor or router 200 represents the destination host for the VIP address. It answers ARP requests for VIP and forwards incoming traffic destined to VIP towards the real IP addresses of the servers 210-230.

The hosts 210-230 have to be configured as a non-ARP alias on the real IP interfaces (IP21, IP22 . . . IP2n). The embodiment shown in FIG. 9 is a typical virtual server implementation also referred to as "Virtual Server via Direct Routing".

In this case, the traffic distributor 200 will normally not send an ARP request to resolve the MAC address of the VIP as the subnet on which the different hosts 210-230 reside do not contain the VIP address, or in other words, the traffic distributor does not have an interface defined on the subnet to which the virtual IP address, VIP belongs.

As a consequence, in this case the route_reply message is broadcast on the network 50. The SPA in the table of FIG. 4 in the route_reply message contains the real IP address of the sending host (IP 21, IP 22, . . . , IP2n). The SPA and the TPA of Table 4 in the message are the same.

In more general words, in the embodiment of FIG. 9, the generated route_reply message is transmitted by the host as a broadcast message to all nodes of the first network, in which the broadcasting node is located, when the host contains a real IP address which is different from the real IP addresses of other hosts to which the traffic distributor distributes traffic and when the virtual IP address does not belong to the first network in which the host is located.

The traffic distributor 200 receives the broadcast messages and configures the forwarding rules. After configuring the forwarding rules, the traffic distributor is prepared to handle incoming traffic destined to VIP. The forwarding rules may be configured with real IP address of hosts 210-230 as destination addresses. Alternatively, MAC address may be used.

Figure 10:
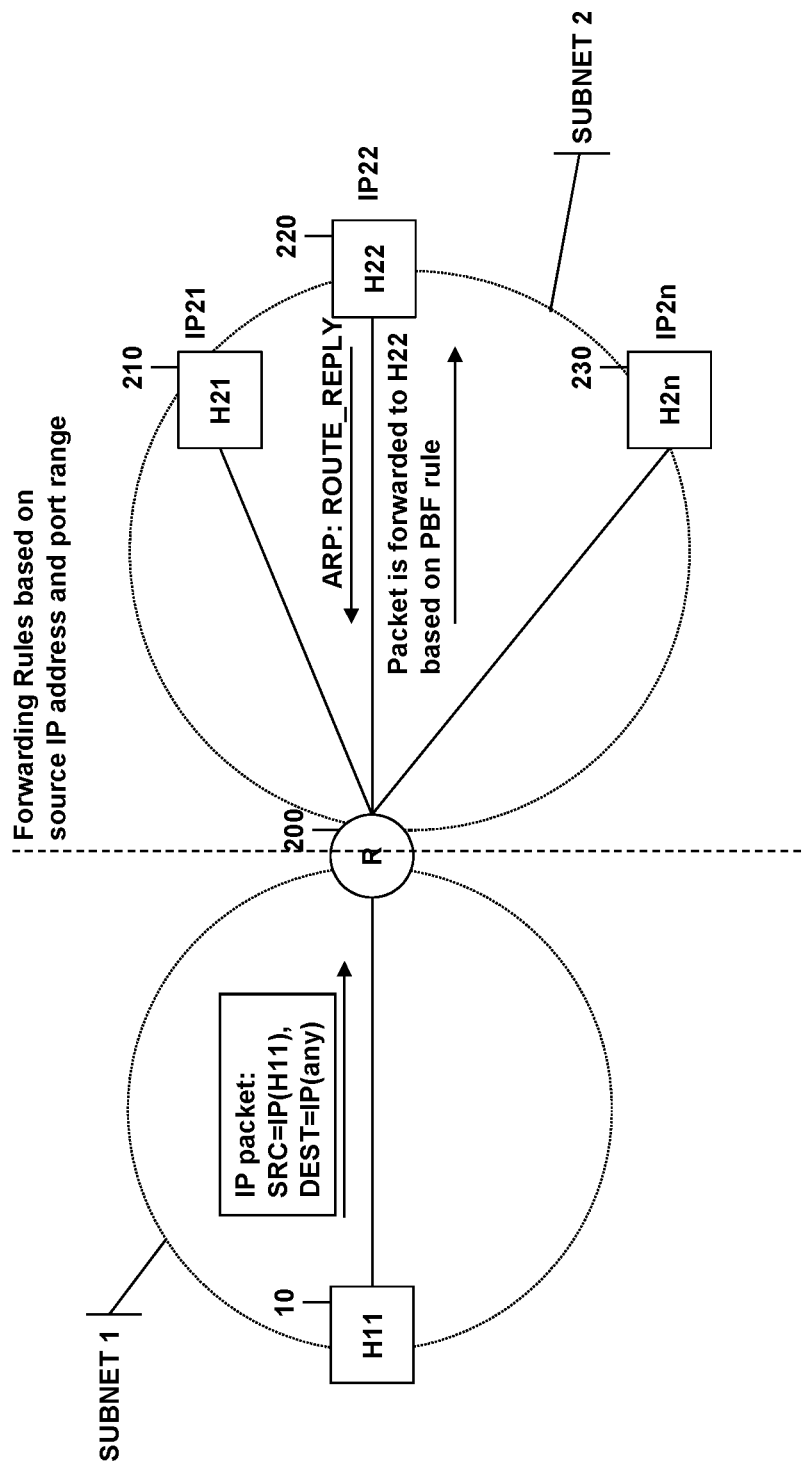
FIG. 10 shows a situation with the forwarding of data packets based on source IP address and port.

In connection with FIG. 10 an embodiment is shown where incoming traffic is forwarded to host 220 based on the source IP address and port. The forwarding rules are preconfigured in the traffic distributor using the route_reply message discussed above. The destination IP address specified in the forwarding rule is the real address of host 220. When the traffic distributor 200 receives a packet with the source IP address of host 10 and any destination IP address, the packet is forwarded to IP 22, the IP address of host 220.

The new ARP message route_reply will be recognized in the network by the hosts supporting this ARP operation. The other hosts which do not recognize this route_reply message will discard it as the operation code (e.g. route_reply=26) is characterized as unassigned in the IANA Operation Codes list. In other words, a forwarding criterion can be at least one of a source IP address and port number from which the IP data packets are received wherein the generated message contains at least one of the source IP address and port number. This generated message then initiates the generation of a forwarding rule in a traffic distributor that IP data packets with said at least one of the source IP address and port number are forwarded to the host from which the generated message is received.

Figure 11:
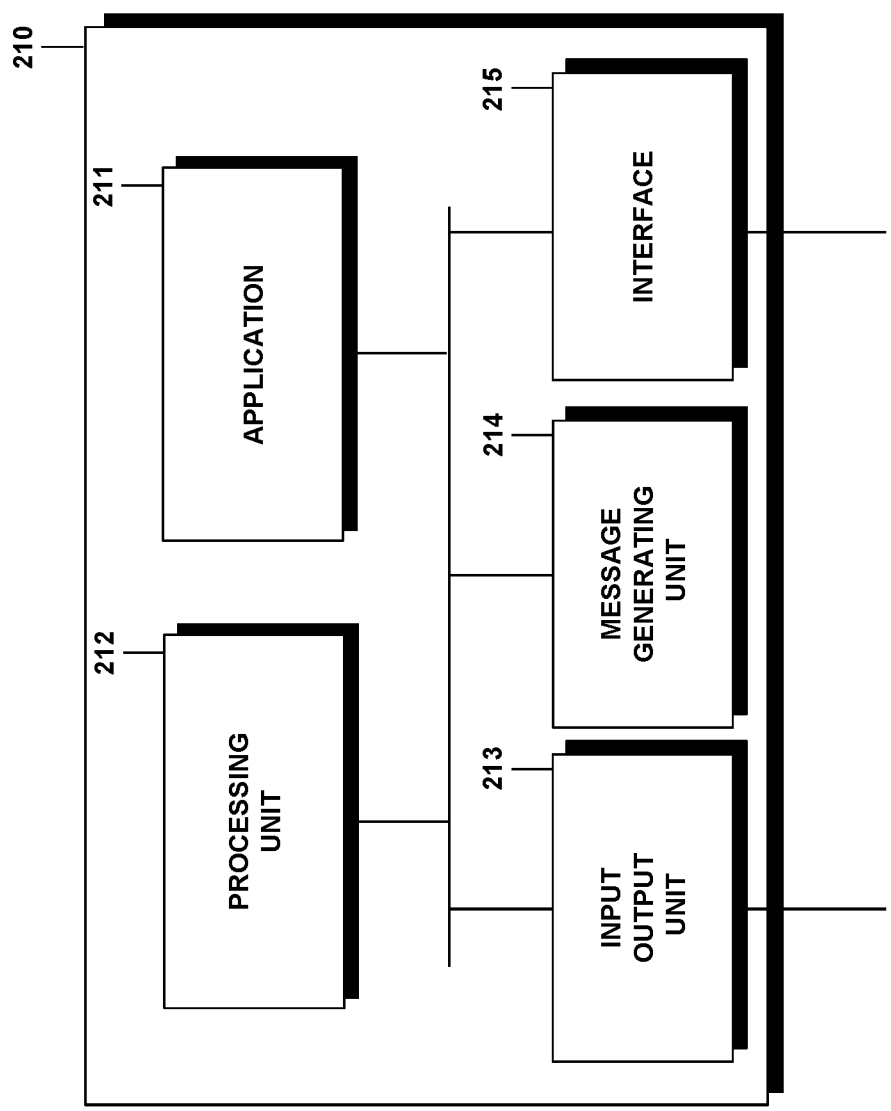
FIG. 11 shows a schematic block diagram of a host to which the traffic is distributed by the traffic distributor.
Figure 12:
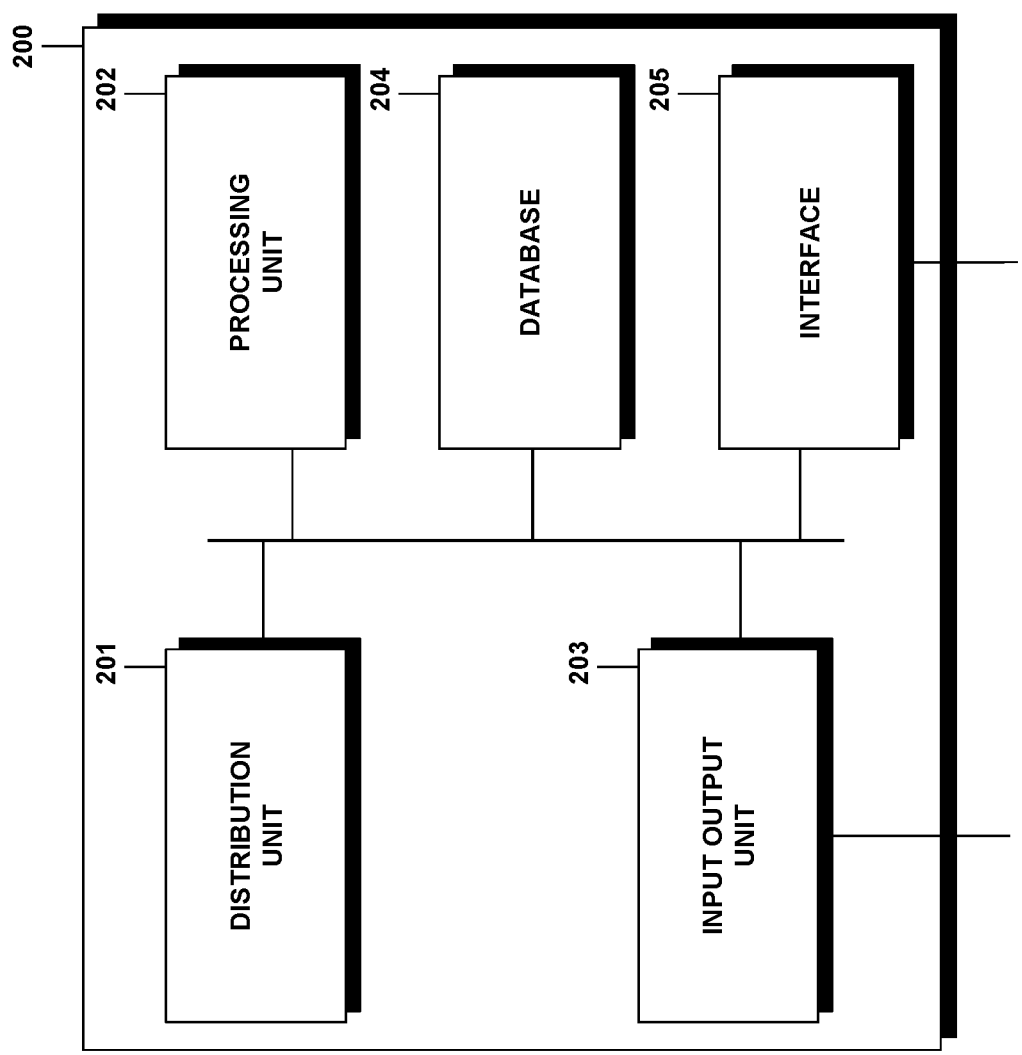
FIG. 12 is a schematic block diagram of the traffic distributor distributing the IP data packets.

In FIGS. 11 and 12, a schematic view of the host generating the route_reply message and of the traffic distributor which configures the forwarding rules based on the received route_reply message are shown.

In FIG. 11 one of the hosts shown in the figures above, where the traffic was distributed between hosts 210-230, is shown, in the embodiment the host 210. The host comprises an application 211 for which the IP data packets are distributed to the host. A processing unit 212 is provided which is responsible for the operation of the host and which inter alia may determine the operating status of the host in such a way that, if a certain operating status is met, a message is generated which is used by the traffic distributor to configure a forwarding rule. This message is generated by a message generating unit 214. The message generating unit generates the route_reply message discussed above and the message is an address resolution protocol message containing the characteristic as the forwarding criterion for which the IP data packets should be forwarded to the host that generates the message. An input/output unit 213 is provided to receive IP data packets and to transmit IP data packets. An interface 215 transmits the generated ARP message to the traffic distributor.

In FIG. 12 the traffic distributor 200 receiving an IP data packet and distributing the data packets to different hosts is shown in further detail. A distribution unit 201 distributes the IP data packets to the different hosts. A processing unit 202 is provided which may control the operation of the traffic distributor and which can inter alia generate the forwarding rule for the host from which the generated ARP message is received. The forwarding rule can be stored in a forwarding table in a database 204.

An input/output unit 203 is able to receive IP data packets and to transmit the IP data packets further to the next node in the network using the information provided by the distribution unit 201. An interface 205 is provided which transmits ARP messages and where ARP messages are received, such as the ARP message generated by the host, and which includes the forwarding criterion to be used by the traffic distributor 200 to generate the forwarding rule.

It should be understood that the units shown in FIGS. 11 and 12 can contain additional components. In connection with FIGS. 11 and 12 only those components were explained in more detail that are needed for understanding the present invention. The different components shown in FIGS. 11 and 12 are shown as separate entities. However, it should be understood that the functions provided by these entitities may be incorporated into other units and the separation into different units may be different to the embodiment shown. Furthermore, the host 210 and the traffic distributor 200 can be a combination of hardware and software components.

The above described mechanism uses the Address Resolution Protocol (ARP) to configure forwarding rules for traffic distribution in IP networks. ARP has the advantage that it is a well-known protocol used for address resolution in most IP networks. In this context, ARP is a good candidate to transfer additional routing information such as port range and protocol associated with the resolved IP address. The packet forwarding is done on the IP layer itself, thus there is no need to pass forwarding rule information through upper layers in order to configure the forwarding rules. The additional data that needs to be transferred comprises only a few additional parameters, e.g. 10 additional octets as discussed above in connection with FIG. 4. This fits in a single Ethernet frame. As a consequence, ARP protocol operation is not significantly degraded when the above described mechanism is used. Furthermore, the complicated manual configuration of the forwarding rules or the implementation of an additional network configuration layer is avoided. Furthermore, the mechanism provides further load balancing possibilities, e.g. the load balancing based on server capacity where each server would automatically extend or reduce its port range based on the available processor capacity.

The invention claimed is:

1. A method, by a host providing an application, to configure forwarding rules in a traffic distributor using an address resolution protocol, wherein the host receives IP data packets distributed by the traffic distributor to a plurality of different hosts located in a first network based on a predefined forwarding criterion contained in the forwarding rules, the host applying the application to the IP data packets, the method comprising the steps of:
- determining, by the host, whether a predefined operating status of the host is met, wherein responsive to the predefined operating status being met;
- generating a message using the address resolution protocol, the message containing information for which at least one characteristic of the predefined forwarding criterion of the IP data packets should be forwarded to the host, the message furthermore containing a configuring indicator by which the traffic distributor is initiated to generate the forwarding rules for the host taking into account the at least one characteristic contained in the message, and
- transmitting the message generated to the traffic distributor.

2. The method according to claim 1, wherein the message is generated containing as the least one characteristic a range of port numbers of the host at which the host is configured to receive IP data packets from the traffic distributor.

3. The method according to claim 1, wherein the host determines as a predefined operating status whether a request message of the address resolution protocol is received, the message generated being transmitted to the traffic distributor as a response message to the request message received.

4. The method according to claim 3 wherein it is furthermore determined as the predefined operating status whether the request message contains the information that for a virtual IP address in received request message IP data packets are distributed by the traffic distributor based on port ranges.

5. The method according to claim 3, wherein the response message is transmitted to a physical address of the traffic distributor which is identified in the received request message.

6. The method according to claim 1, wherein the host determines the predefined operating status as a preconfigured operating status of the host, wherein responsive to the preconfigured operating status being detected, the generated message is transmitted as a broadcast message to all nodes of the first network.

7. The method according to claim 6 wherein the preconfigured operating status is detected when the host detects that it is working with a shared virtual IP address, wherein other hosts in the first network have the same virtual IP address, the traffic distributor distributing the IP data packets between the host and the other hosts for the application to be applied.

8. The method according to claim 1, wherein the predefined forwarding criterion is at least one of a destination IP address and port number to which the IP data packets are to be transmitted, wherein the generated message contains at least one of destination IP address and port number, the generated message initiating the generation of a forwarding rule in the traffic distributor that IP packets with said at least one of destination IP address and port number are forwarded to the host from which the generated message is received.

9. The method according to claim 1, wherein the predefined forwarding criterion is at least one of a source IP address and port number from which the IP data packets are received, wherein the generated message contains at least one of source IP address and port number, the generated message initiating the generation of a forwarding rule in the traffic distributor that IP packets with said at least one of source IP address and port number are forwarded to the host from which the generated message is received.

10. The method according to claim 1, wherein the generated message is transmitted by the host as a broadcast message to all nodes of the first network when the host contains an IP address which is different from the IP addresses of other hosts to which the traffic distributor distributes traffic, and when the IP address does not belong to the first network in which the host is located.

11. The method according to claim 1, wherein the generated message is transmitted by the host as a broadcast message to all nodes of the first network or as a response message in response to a predefined message received from the traffic distributor when the host has the same virtual IP address as the other hosts to which the IP data packets are distributed by the traffic distributor.

12. A host configured to provide an application and configured to configure forwarding rules in a traffic distributor using an address resolution protocol, the host comprising:
- an input/output unit configured to receive IP data packets distributed by the traffic distributor to a plurality of different hosts located in a first network based on a predefined forwarding criterion contained in the forwarding rules,
- an application to be applied to the received IP data packets,
- a processing unit configured to determine whether a predefined operating status of the host is met, the processing unit being a hardware component,
- an interface configured to transmit a message of the address resolution protocol to the traffic distributor, and
- a message generating unit configured to generate messages according to an address resolution protocol, wherein if the processing unit determines that the predefined operating status is met, the message generating unit generates the message using the address resolution protocol containing information for which at least one characteristic of the predefined forwarding criterion the IP data packets should be forwarded to the host, the message furthermore containing a configuring indicator by which the traffic distributor is initiated to generate the forwarding rule for the host taking into account the at least one characteristic contained in the message, wherein the interface is configured to transmit the generated message to the traffic distributor.

13. The host according to claim 12, wherein the message generating unit is configured to include, as the at least one characteristic, a range of port numbers of the host at which the host is configured to receive IP data packets from the traffic distributor.

14. A method, by a traffic distributor, to generate forwarding rules used by the traffic distributor to distribute IP data packets to a plurality of hosts based on a predefined forwarding criterion contained in the forwarding rules, wherein the plurality of hosts are located in a first network, the method comprising the steps of:
- receiving a message generated with an address resolution protocol from one of the plurality of hosts, the message containing information for which at least one characteristic of the predefined forwarding criterion the IP data packets should be forwarded to the host from which the message is received, the message furthermore containing a configuring indicator by which the traffic distributor is initiated to generate a forwarding rule for the host from which the message is received taking into account the at least one characteristic contained in the message, generating the forwarding rule for the host from which the message is received based on the configuring indicator contained in the message received, the generated forwarding rule containing the at least one characteristic contained in the message, distributing IP data packets to the plurality of hosts, wherein the IP data packets are distributed to the host from which the message is received based on the generated forwarding rule.

15. The method according to claim 14, wherein the message is received as a reply message to a request message from said one host sent by the traffic distributor to the first network using the address resolution protocol.

16. The method according to claim 15, wherein reply messages are received from the hosts of the first network, wherein for each received reply message, the forwarding rule for the host from which the reply message was received is generated using the at least one characteristic of the predefined forwarding criterion contained in the corresponding message received.

17. The method according to claim 16, wherein the received reply message received from one of the hosts contains a virtual IP address of said one host, at least one port number at which said one host is configured to receive the IP data packets and a physical address of said one host that the traffic distributor uses to forward IP data packets to said one host.

18. The method according to claim 14, wherein the message received is a broadcast message broadcasted from one of the hosts contained in the first network, the traffic distributor generating the forwarding rule for the host from which the broadcast message is received based on the at least one characteristic contained in the received broadcast message.

19. A traffic distributor configured to generate forwarding rules used by the traffic distributor to distribute IP data packets to a plurality of hosts based on a predefined forwarding criterion contained in the forwarding rules, the traffic distributor comprising:

an interface configured to receive a message generated with an address resolution protocol from one of the plurality of hosts, the message containing information for which at least one characteristic of the predefined forwarding criterion the IP data packets should be forwarded to the host from which the message is received, the message furthermore containing a configuring indicator by which the traffic distributor is initiated to generate a forwarding rule for the host from which the message is received taking into account the at least one characteristic contained in the message, a processing unit configured to generate forwarding rules for IP data packets, the processing unit being a hardware component, wherein the processing unit is configured to generate the forwarding rule for the host from which the message is received based on the configuring indicator contained in the message received, the processing unit generating, for the host from which the message is received, the generated forwarding rule containing the at least one characteristic contained in the received message, and a distribution unit configured to distribute the IP data packets to the plurality of hosts, wherein the distribution unit is configured to distribute IP data packets to said one host based on the generated forwarding rule.

* * * * *